(12) United States Patent
Lyle et al.

(10) Patent No.: US 7,272,891 B2
(45) Date of Patent: Sep. 25, 2007

(54) AUTOMATIC PLUMBING DEVICE

(75) Inventors: Steve Oneal Lyle, Lena, MS (US); Kenneth Miller Wallace, Collinsville, MS (US); Rocky Kent Reeves, Decatur, MS (US); David Kevin Rainey, Meridian, MS (US); Stewart Keith Parker, Carthage, MS (US); James Virgil Jones, Forest, MS (US); Willis Paul Henderson, Forest, MS (US)

(73) Assignee: Mississippi Department of Transportation, Jackson, MS (US)

( * ) Notice: Subject to any disclaimer, the term of this patent is extended or adjusted under 35 U.S.C. 154(b) by 6 days.

(21) Appl. No.: 11/394,355

(22) Filed: Mar. 30, 2006

(65) Prior Publication Data

US 2006/0218806 A1    Oct. 5, 2006

Related U.S. Application Data

(60) Provisional application No. 60/666,814, filed on Mar. 31, 2005.

(51) Int. Cl.
*G01C 15/08* (2006.01)
(52) U.S. Cl. ....................................... 33/295
(58) Field of Classification Search ................ 33/290, 33/291, 293, 294, 295, 296, 391, 401
See application file for complete search history.

(56) References Cited

U.S. PATENT DOCUMENTS

| | | | | |
|---|---|---|---|---|
| 3,857,639 A * | 12/1974 | Mason | .................. | 33/293 |
| 4,899,452 A * | 2/1990 | Schafer | .................. | 33/296 |
| 5,027,521 A * | 7/1991 | Del Giorgio | .................. | 33/293 |
| 5,459,932 A * | 10/1995 | Rando et al. | .................. | 33/291 |
| 5,619,802 A * | 4/1997 | Rando et al. | .................. | 33/291 |
| 5,839,199 A * | 11/1998 | Ogawa | .................. | 33/291 |
| 5,852,493 A * | 12/1998 | Monnin | .................. | 33/291 |
| 7,066,276 B1 * | 6/2006 | Wilcox | .................. | 33/296 |
| 7,073,269 B2 * | 7/2006 | McCarty | .................. | 33/391 |
| 2003/0079356 A1 * | 5/2003 | Crain et al. | .................. | 33/296 |
| 2006/0218805 A1 * | 10/2006 | Greco | .................. | 33/291 |

\* cited by examiner

*Primary Examiner*—G. Bradley Bennett
(74) *Attorney, Agent, or Firm*—Lawrence Arthur Schemmel

(57) ABSTRACT

This invention relates to an automatic or self plumbing device and method for maintaining survey or data collection or reflection equipment in a vertical plumb position despite horizontal and/or vertical changes of position of the device or vehicle with the device attached thereto. The invention also provides a means for maintaining survey or data collection or reflection equipment in a vertical plumb position and at a constant height above ground or surface to be surveyed. The invention provides a means for mounting or attaching the device to a vehicle or other mobile prime mover and a means for remotely changing the position of the device mounted on the vehicle from within the vehicle for accurate, efficient, and timely collection of data while the device and vehicle are stationary or in motion.

43 Claims, 3 Drawing Sheets

AUTOMATIC PLUMBING DEVICE

CROSS-REFERENCE TO RELATED APPLICATION

This application is a regular National application claiming priority from Provisional Application, U.S. Application Ser. No. 60/666,814 filed Mar. 31, 2005. The entirety of that provisional application is incorporated herein by reference.

FIELD OF THE INVENTION

The invention relates to a novel plumbing device and method for maintaining survey or data collection or reflection equipment in a vertical plumb position. More specifically, the invention relates to a novel automatic or self plumbing device and method for maintaining survey or data collection equipment, such as a surveying antenna or other target or reflector, in a vertical plumb position despite horizontal and/or vertical movement or changes in position of the device or a vehicle with the device attached thereto. The invention provides a means for maintaining surveying or data collection equipment at a constant height or distance above ground. The invention also provides a means for mounting or attaching the device to a vehicle or other mobile prime mover for accurate, efficient, and timely collection of data while stationary or in motion.

BACKGROUND OF THE INVENTION

The field of surveying requires the accurate measurement of both horizontal and vertical data in the X, Y, and Z axes of the standard three-dimensional Cartesian coordinate system. The plumb bob, the level, and the transit have long been used to obtain such data. More recent technology utilizing global positioning system (GPS) methods of surveying increases both accuracy and efficiency of obtaining data. Maintaining accurate vertical plumb in field surveying, particularly when in mobile operation, is critical to obtaining accurate data. Previous patents exist for various plumb bob apparatus and leveling devices. However, these patents do not involve or suggest a device or method to automatically maintain a surveying or data collection target in a vertical plumb position that also compensates for changes in the position of the device, particularly when survey or other data is collected while the device is being moved or in mobile operation.

Several devices and approaches have been developed to improve measurement efficiency in surveying. U.S. Pat. No. 6,633,256 provides for a method and system for measuring coordinates of a target and involves manual, stationary collection of data. Other devices and methods that provide automatic plumb and level involve mechanisms using visible laser diodes, light beams, and acoustic signals (U.S. Pat. Nos. 5,619,802; 5,541,727; 5,524,352; 5,459,932; 5,287,627; 5,182,863; and 5,075,977). Still other devices involve projected light for leveling and plumbing functions for construction use (U.S. Pat. Nos. 6,625,895; 6,028,665; and 5,184,406). U.S. Pat. No. 6,594,912 provides an electronic plumb indicator for monopoles, survey poles, and GPS antennas to increase speed and accuracy at which surveying poles and GPS antenna poles are plumbed to vertical positions.

These devices, tools, and methods do not necessarily provide for maintaining a surveying or data collection antenna, target, or equipment in a vertical plumb position while in the field and particularly while in motion. The present invention provides effectively instantaneous and continuous vertical plumb and effectively constant height above ground for a data collection target or reflector while the device and vehicle to which it is mounted are stationary or are constantly changing horizontal and vertical positions in the field while in motion. Previous devices and methods do not necessarily provide accurate, efficient, safe, or timely collection of field survey data and effectively instantaneous and continuous vertical plumb and effectively constant height above ground for the target antenna or reflector while in motion as does the present invention.

Although known methods exist to improve measurement efficiency in surveying and to vertically plumb targets, it remains a significant goal of those skilled in the art to devise a simple device and method to specifically provide automatic or self vertical plumbing of a surveying target or reflector or other equipment requiring vertical plumb in field applications, to provide accurate, efficient, and safe collection of data thereby, and to provide such automatic vertical or self plumbing of the target particularly while such device and target are either stationary or in motion. The present inventors have designed a device and method for these purposes.

SUMMARY OF THE INVENTION

It is an object of the present invention to provide a plumbing device and method for automatically maintaining survey or data collection equipment in a vertical plumb position.

It is another object of the present invention to provide an automatic or self plumbing device and method for maintaining survey or data collection equipment in a vertical plumb position despite horizontal and/or vertical changes in position of the device.

It is yet another object of the present invention to provide an automatic or self plumbing device and method that includes a means for maintaining survey or data collection equipment in a vertical plumb position.

It is yet another object of the present invention to provide an automatic or self plumbing device and method that includes a means for maintaining survey or data collection equipment at a constant height or distance above ground.

It is another object of the present invention to provide an automatic or self plumbing device and method for maintaining survey or data collection equipment in a vertical plumb position and that includes a means for mounting or attaching the device to a vehicle or other mobile prime mover for accurate, efficient, and timely collection of horizontal and vertical survey or other data while the device and vehicle are stationary or in motion.

With the foregoing and other objects, features, and advantages of the present invention that will become apparent hereinafter, the nature of the invention may be more clearly understood by reference to the following detailed description of the preferred embodiments of the invention and to the appended claims.

DESCRIPTION OF THE PREFERRED EMBODIMENTS

Figure 1:
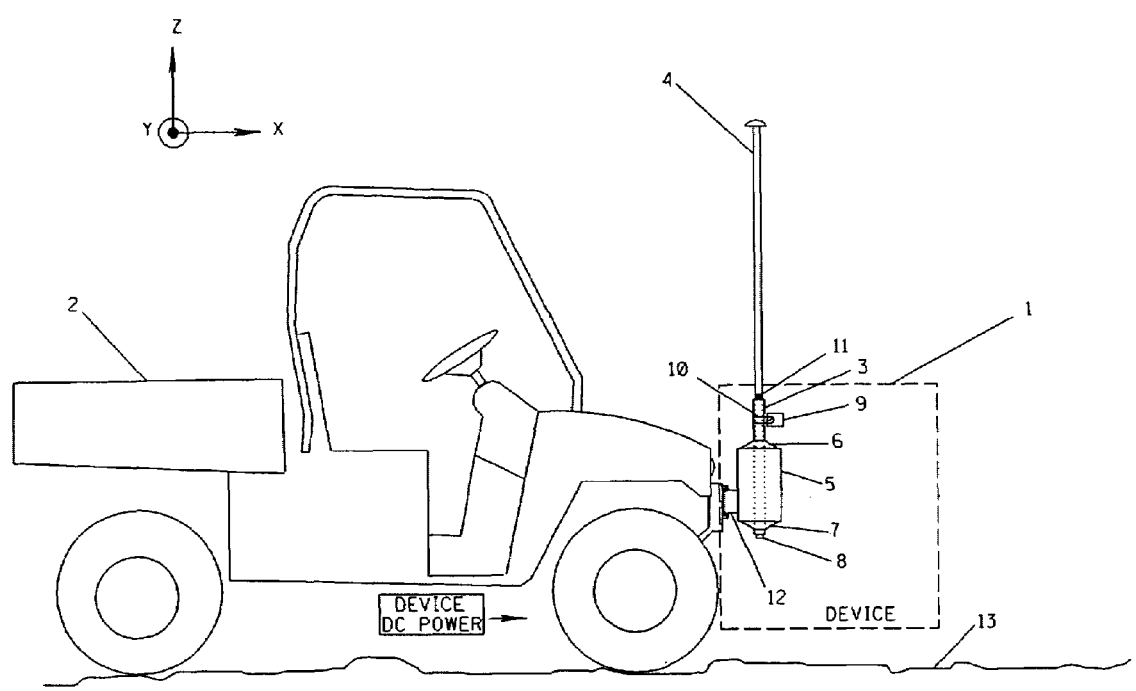
FIG. 1 is a graphical illustration of the device generally showing the device configuration including certain device components and the device mounted to a vehicle.

The modern Cartesian three-dimensional coordinate system consists of the X, Y, and Z axes that are mutually orthogonal, or each at a right angle, to each other. For the present invention, the X axis means the direction of travel both forward and/or backward along an exactly horizontal line or plane. The Y axis means the direction exactly 90 degrees perpendicular to the X axis, both left and/or right, along an exactly horizontal line or plane. The Z axis means the direction exactly 90 degrees perpendicular to both the X axis and Y axis, both up and/or down, along an exactly vertical line or plane. Vertical plumb position means vertical in relation to earth ground and parallel and along the Z axis such that the line formed thereby is regarded as directed exactly toward the earth's center of gravity. A global positioning system (GPS) antenna means and encompasses many known items and methods of remote data collection and reflection including, but not limited to, a GPS antenna, survey or data collection equipment, surveying target, reflector, surveying prism, total station prism, or other similar and commonly known surveying and data collection or reflection mechanisms. The surface to be surveyed means the surface, ground surface, terrain, ground terrain, or ground material to be surveyed, measured, and/or quantified.

The device and method of the present invention makes it possible to automatically maintain a surveying or other target or data collection or reflection equipment in a vertical plumb position while the device is in motion despite typical terrain changes and resultant changes along the horizontal and/or vertical X, Y, and Z axes positions of the device or of a vehicle and device mounted thereto. Additional objects and advantages of the invention provide a means of maintaining a target or data collection equipment in an effectively instantaneous and continuous vertical plumb position despite typical terrain changes and resultant changes along the horizontal and/or vertical X, Y, and Z axes positions of the device or of a vehicle and device mounted thereto. Additional objects and advantages of the present invention serve to provide a means for maintaining surveying or other target or data collection or reflection equipment at an effectively constant height or distance above ground. Further additional objects and advantages of the present invention serve to provide a means for mounting or attaching the device to a vehicle or other mobile prime mover and obtaining horizontal and vertical survey or other data while the device and vehicle or other prime mover are stationary or are in motion.

The present invention eliminates the need for surveying or data collection personnel to stop at specific locations and manually plumb surveying or other targets. The present invention allows survey personnel to collect data using a vehicle in motion without the need to stop and manually plumb the target or equipment. It will be understood by those skilled in the art that the present invention is not limited in its application to the details of the arrangement described herein since it is capable of other embodiments and modifications. Moreover, the terminology used herein is for the purpose of such description and not of limitation.

The present invention provides a simple, immediate, and accurate device and method for automatically maintaining a surveying or other target or data collection equipment in a vertical plumb position, regardless of the terrain changes that a vehicle and device mounted thereto would encounter in a typical field operation utilizing such equipment. The device of the present invention in a preferred embodiment operates to maintain data collection equipment, such as a global positioning system (GPS) antenna, in an effectively instantaneous and continuous vertical plumb position if any horizontal or vertical changes in device position occur.

In a preferred embodiment, the device and method of the present invention operate to maintain a GPS antenna or similar data collection or reflection equipment at an effectively constant height or distance above ground.

In a preferred embodiment, the device and method of the present invention operate to allow the device to be attached or mounted to and removed from a vehicle or other mobile prime mover. In a preferred embodiment, the device and method operate to maintain surveying or data collection equipment in a vertical plumb position while such device or vehicle and device attached or mounted thereto is stationary or is mobile.

In accordance with the present invention, the device and method provide survey or data collection personnel the ability to efficiently and accurately collect surveying or other data with a moving or mobile surveying antenna, GPS antenna, or similar target or reflector, thereby providing useful data in multiple fields such as highway surveying. In accordance with the present invention, survey data including existing and new roadway profiles, pavement edges, lane breaks, centerlines, and ground cross-sections, as well as ground elevations, exact positions and locations, and mapped ground terrains can be efficiently and accurately obtained using data collection equipment from within a moving vehicle. The present invention in a preferred embodiment allows such data collection from a moving or mobile vehicle rather than from personnel on foot and allows data collection in a safer, quicker, more efficient, and less costly manner.

In another aspect of the present invention, the automatic plumbing device includes an electrical, pneumatic, fluid-driven, gyroscopic, laser, sonar, seismic detection, or similar system or means, or combinations thereof, readily apparent to those skilled in the art, to detect X axis and Y axis movement in the device and to maintain the GPS antenna or target, or other data collection, reflection, or surveying equipment, vertically plumb for accurate and efficient measurement of exact distances and collection of data in all axes.

In another aspect of the present invention, the automatic plumbing device includes an electrical, pneumatic, fluid-driven, gyroscopic, laser, sonar, seismic detection, or similar system or means, or combinations thereof, readily apparent to those skilled in the art, to detect Z axis movement in the device and to maintain the GPS antenna or target, or other data collection, reflection, or surveying equipment, at a constant height above the ground or surface to be surveyed.

In another aspect of the present invention, the data collection or surveying equipment is removable from the automatic plumbing device for manual or conventional stationary collection of data.

The present invention in a preferred embodiment is a device that, while stationary or in motion, automatically maintains in a vertical plumb position surveying equipment, such as a global positioning system (GPS) antenna, a GPS antenna mounted on a pole, a surveying prism, a total station prism, or similar surveying or data collection or reflection equipment, and thereby allows data collection while stationary or in motion. FIG. 1 shows a typical view of the device 1 mounted to a vehicle 2, which can be any mobile prime mover, which travels on or over a surface to be surveyed 13. A GPS or other data receiver is generally positioned elsewhere, such as inside the vehicle 2.

Figure 2:
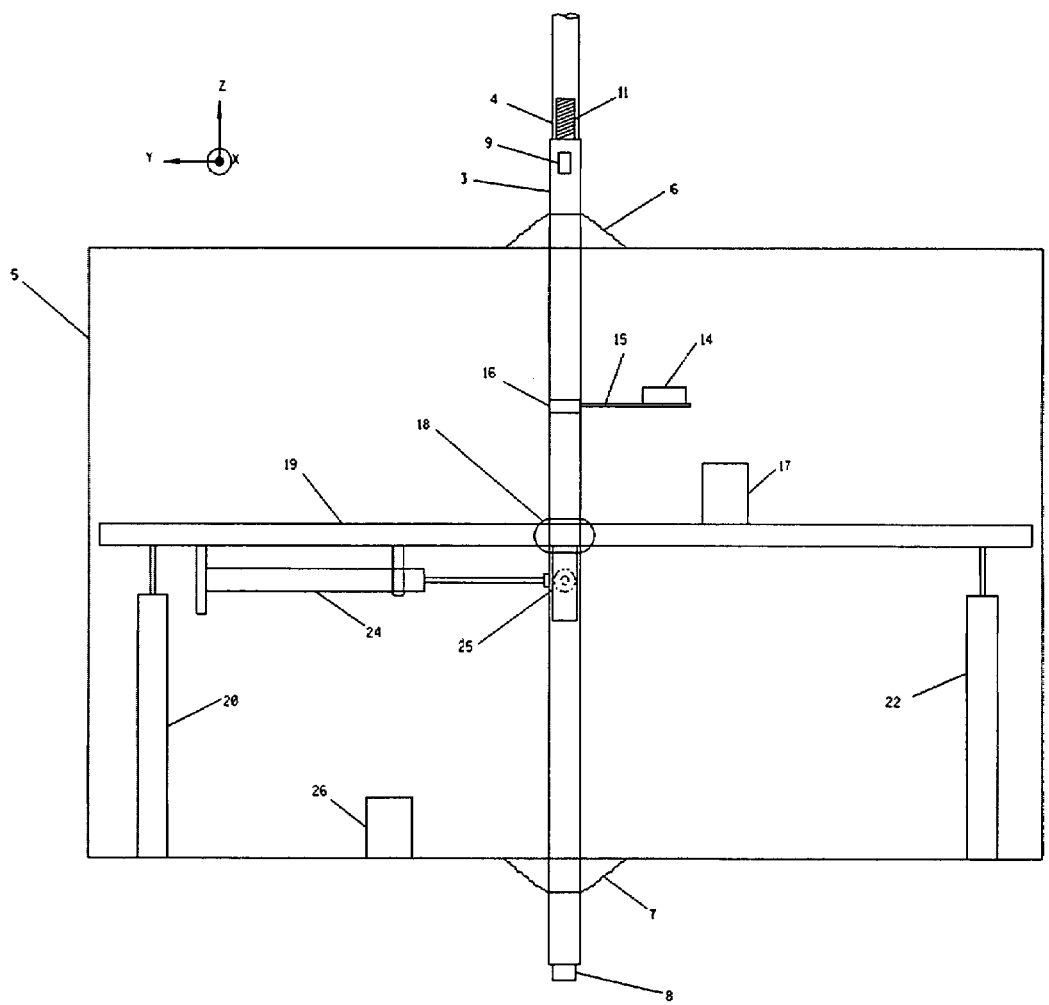
FIG. 2 is a graphical illustration of the front view of the device housing including internal and external components.

The device 1 is relatively self-contained in that most of its components are housed in a housing 5 and only requires access to vehicle 2 direct current (DC) electrical power or other independent DC power supply. The housing 5 is a standard, typical waterproof outdoor housing. The device 1 includes a receiver tube 3 having a top end and a bottom end, open on both ends, and having a fixed diameter to which is mounted the GPS antenna 4 having a threaded bottom end or other similar surveying equipment having a threaded bottom end. The receiver tube 3 has a threaded bolt 11 with threads placed in the up Z axis position mounted via a standard sleeve having a diameter slightly smaller than that of the receiver tube 3 that is mounted tightly within and inside the top end of the receiver tube 3, and held in place with standard set screws. Threaded bolt 11 accepts a complementary threaded bottom end of the GPS antenna 4, as shown in FIGS. 1 and 2. The mounting scheme of the GPS antenna 4 to the receiver tube 3 can take multiple other common forms for mounting or connecting tubes together, including a mount without a threaded bolt system whereby the GPS antenna 4 would have a slightly smaller diameter that than of the receiver tube 3 and whereby the GPS antenna 4 is mounted and retained inside and within the receiver tube 3 sufficiently far enough for the GPS antenna 4 to rest on a stop plate or similar mechanism within the receiver tube 3 and to remain in place despite tilted conditions of the device 1 and variable ground terrains encountered by vehicle 2 during data collection. The receiver tube 3 would be generally open at the top end thereof for accepting the GPS antenna 4 in one alternate mounting design. The housing 5 includes at least one opening in the top thereof and at least one opening in the bottom directly below, both openings for accepting the receiver tube 3. The openings are large enough to allow the housing 5 position in either or both the X axis and Y axis to change as the terrain changes as described herein and simultaneously to maintain the receiver tube 3 and GPS antenna 4 in a vertical plumb position. The device 1 includes a first and a second flexible or pliable weatherproof boot 6 and 7, respectively, each consisting of rubber, neoprene, or similar common material attached to the receiver tube 3 and housing 5 for waterproofing the housing 5 at the entry and exit locations of the receiver tube 3, respectively. The first and second waterproof boots 6 and 7 allow the receiver tube 3 to be freely moved and also maintain the device 1 internal components dry in wet weather and thereby provide for continuous data collection in either wet or dry weather conditions.

A laser pointer 9 or similar typical light-emitting pointer or visible cursor is mounted to the receiver tube 3 using a standard mounting bracket 10 below the top of the receiver tube 3 and above the top of the first waterproof boot 6 and is pointed in the direction of vehicle 2 travel. The laser pointer 9 provides and projects a precise visible light point onto the surface to be surveyed 13, thereby allowing vehicle 2 driver to visually observe such point and manually maintain the vehicle 2 and device 1 aligned with objects or lines being surveyed. Representative lines being surveyed include, but are not limited to, centerlines of roadways, edges of pavements, curb lines, and the like. A proximity sensor 8 is mounted to the bottom end of the receiver tube below the second weatherproof boot 7. Proximity sensor 8 is attached to the center of a standard sleeve having a diameter slightly smaller than that of the receiver tube 3 and that is mounted tightly within the receiver tube 3 and held in place with standard set screws.

FIG. 2 shows a front view of the device 1 and housing 5 and internal and external components. The receiver tube 3 is mounted to a pivot bracket coupling 18, which may be any standard rotatable and/or pivotable bracket or ball and socket coupling means commonly known in the art. The pivot bracket coupling 18 is a means for allowing the receiver tube 3 to move or rotate along or about the X axis and/or Y axis to compensate for changes in terrain experienced by the vehicle 2 and device 1. The coupling 18 is mounted to a base plate 19 having an opening or hole in or near the center thereof for accepting the receiver tube 3, which mounting allows the base plate 19 and receiver tube 3 to be moved up and down together along the Z axis to maintain the bottom of the receiver tube 3, and therefore the GPS antenna 4, at a constant height above the ground or surface to be surveyed 13. The proximity sensor 8 provides height or distance information to measure and determine device 1 position relative to the surface to be surveyed 13 and to maintain a constant height above the surface to be surveyed 13 at all times during data collection. The proximity sensor 8 in a preferred embodiment is a laser-based sensor, but it will be understood that it may also consist of any laser or sonar sensor or other proximity sensing mechanisms or combinations thereof readily apparent to those skilled in the art. The distance between proximity sensor 8 and GPS antenna 4 is constant. The proximity sensor 8 measures elevation changes between the surface to be surveyed 13 and the bottom of the receiver tube 3 and provides information of Z axis position changes of the receiver tube 3 and base plate 19 by communicating electrically with at least one first relay 26. First relay 26 communicates electrically with actuators 20, 21, 22, and 23, each having a base end and a movable plunger end. The base end of each actuator 20 through 23 is mounted to the bottom of housing 5 and the movable plunger end of each actuator 20 through 23 is connected to the bottom of the base plate 19, as shown in FIG. 2. Actuators 20 through 23 move the base plate 19, receiver tube 3, and pivot bracket coupling 18 up or down along the Z axis, thereby maintaining the receiver tube 3 and GPS antenna 4 at a constant height above ground or surface to be surveyed 13.

Figure 3:
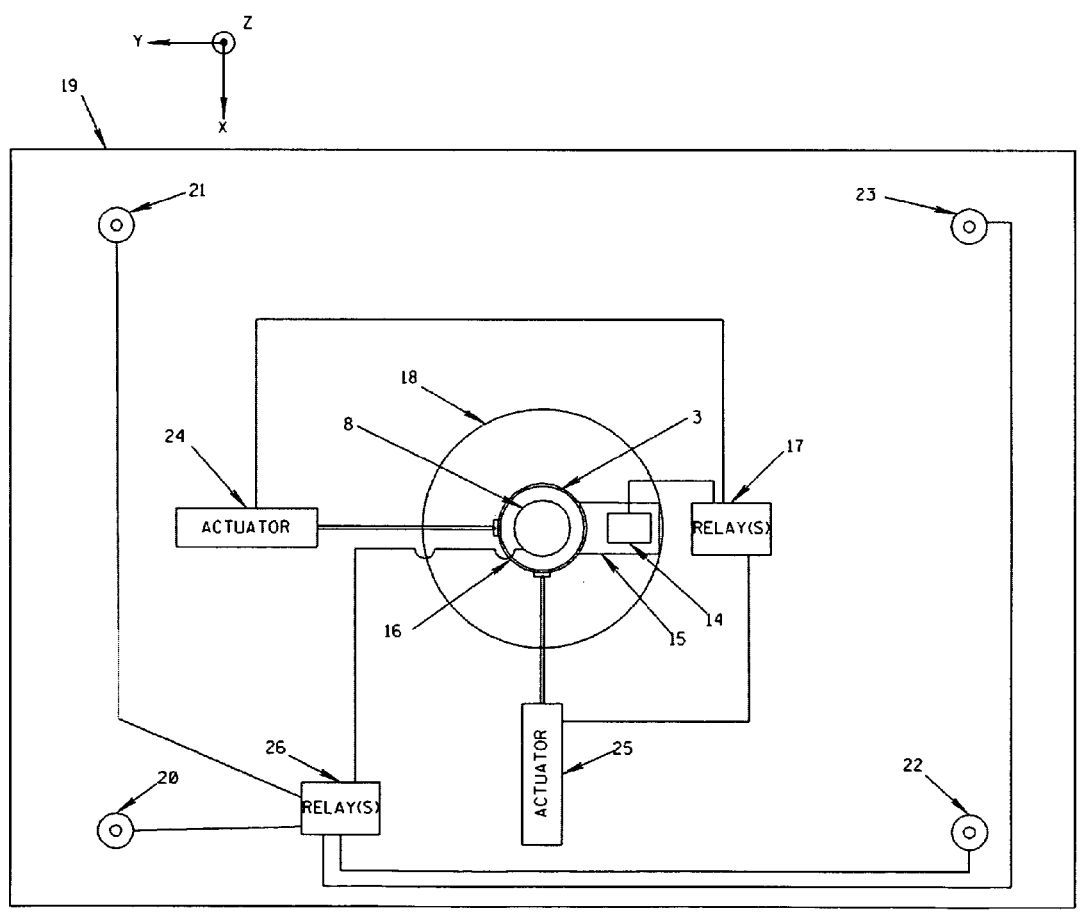
FIG. 3 is a graphical illustration of the top view of the device housing including internal and external components and connections between components.

As the device and vehicle change position in either or both the X axis and Y axis, a rate gyroscope 14 mounted to the receiver tube 3 via mounting plate 15 and bracket 16 within the housing 5 senses and measures tilt of the receiver tube 3 in either or both the X axis and the Y axis and communicates electrically with at least one second relay 17. The tilt sensing mechanism in a preferred embodiment consists of a rate gyroscope 14, but it will be understood that it may consist of or be any tilt sensing mechanism or combinations thereof that is or are commonly known to those skilled in the art including, but not limited to, application specific integrated circuits (ASICs), computers, processors, microprocessors, digital signal processors (DSPs), seismograph or seismic equipment, or any other processing means or combinations thereof readily apparent to those skilled in the art. Second relay 17 communicates electrically with actuators 24 and 25, each also having a base end and a movable plunger end. Each actuator 24 and 25 is mounted to the bottom of base plate 19, as shown in FIG. 2, with the movable plunger end of each actuator 24 and 25 being connected to the receiver tube 3 substantially 90 degrees apart from each other in the horizontal X-Y plane, also as shown in FIGS. 2 and 3. The receiver tube 3, mounted to the pivot bracket coupling 18, which itself is mounted to the base plate 19, is thereby allowed to move freely in the X axis and Y axis within the hole in the base plate 19. The receiver tube 3 therefore is moved independently of the device housing 5 via actuators 24 and 25. The base plate 19 is moved with and along the same line of direction as the device housing 5 so that, for example, if the housing 5 is moved from an angle of 0 degrees in the X axis to an angle of 20 degrees along or above the positive X axis (about the positive Y axis), representing an incline or hill of 20 degrees, the base plate 19 is moved the same distance and in the same direction. The base plate 19 likewise is moved up and/or down (along the Z axis) along with the same movement and distance up and/or down of the housing 5 via actuators 20 through 23. Once tilt has been sensed and in combination with the pivot bracket coupling 18, actuators 24 and 25 move the receiver tube 3 within the hole in the base plate 19 along the proper X axis and/or Y axis to compensate for the tilt of the base plate 19 and to maintain the receiver tube 3 and therefore the GPS antenna 4 in a vertical plumb position. Actuators 20 through 25 can be any mechanism that efficiently moves the base plate 19 and receiver tube 3 electrically, mechanically, pneumatically, via fluid, or by any other common method or combination thereof.

The device 1 maintains the receiver tube 3 and GPS antenna 4 in a vertical plumb position and allows the housing 5, via the pivot bracket coupling 18, to be tilted to an angle of 30 degrees from exactly horizontal along the X axis and/or Y axis (corresponding to a rotation about the Y axis and/or X axis, respectively), up or down and/or left or right in terms of direction, that likewise corresponds to ground terrain changes and vehicle 2 position changes for traveling uphill, downhill, or incurring left or right side elevation changes up and/or down. The device 1 can be moved or tilted in either stationary or mobile operation to any angle between 0 degrees and 30 degrees from exactly horizontal along or about either or both the X axis and Y axis and will continue to maintain the receiver tube 3 and GPS antenna 4 or data collection target in a vertical plumb position. It should be understood and recognized that in the preferred embodiment these tilt angles are based on practical component costs and realistic field conditions of typical maximum ground elevations and variations and that other embodiments are possible and within the scope of the present invention that utilize other of similar components or combinations thereof readily known to those skilled in the art that allow for greater tilt angles. Proximity sensor 8 simultaneously measures distance or height above ground for actuators 20 through 23 to maintain the base plate 19, pivot bracket coupling 18, receiver tube 3, and GPS antenna 4 at a constant height above the ground or surface to be surveyed 13 or measured.

FIG. 3 shows a top view of the base plate 19 from inside the housing 5 and includes internal and external components and connections. Actuators 21 and 23, not visible in FIG. 2, are shown in FIG. 3.

The device 1 is mounted to vehicle 2 via a sliding mounting bracket 12 or similar standard mounting means for allowing ease of installation to and removal from vehicle 2. Sliding mounting bracket 12 or similar mounting means allows the device 1 to be mounted parallel to the front, rear, or side of vehicle 2 to allow the device 1 to be positioned at different locations along the front, rear, or side thereof. The mounting means provides for collection of survey or other data from any mounting location on vehicle 2. Preferable mounting locations are on the front or rear of vehicle 2. The mounting means can include a means for moving or relocating the mounting position of the device 1 manually or remotely from within the vehicle. The ability to remotely change the position of the mounting location of the device 1 on the vehicle 2 from within the vehicle 2 eliminates the need for the driver to exit and manually move or reposition the device 1. The means for moving or relocating the mounting position of the device 1 provides more efficient data collection on or near traveled roadways and increased safety for the surveyor, driver, and traveling public.

The above is a detailed description of particular embodiments of the present invention. All embodiments disclosed and claimed herein can be easily executed in light of this disclosure. Those of ordinary skill in the art, in light of the present disclosure, should recognize and understand that a wide variety of obvious alternatives, variations, and modifications of the embodiments disclosed herein can be selected and made without departing from the true scope and spirit of the present invention. The invention is described both generically and regarding specific embodiments, while the full scope of the invention is set out in the claims and their equivalents that follow. The disclosure and description presented further explain the invention and are not to be interpreted or inferred as limiting thereof. The claims and specification should not be construed to unduly narrow the complete scope of protection to which the present invention is entitled. The disclosure and appended claims are intended to cover all modifications that may fall within the scope of the claims.

What is claimed is:

1. An automatic plumbing device for positioning and maintaining a target in a plumb orientation, in spite of a tilted condition of the device itself, the device comprising:

a housing having at least one opening in the top and at least one opening in the bottom thereof;

a base plate having a top surface and a bottom surface and an opening near the center thereof tiltably mounted in said housing so that it can tilt in a first X axis and a second Y axis;

pivotable bracket coupling means mounted to said base plate in the center and over top of the opening of said base plate and tiltably mounted so that it can tilt in said first X axis and said second Y axis;

a receiver tube with a top end and a bottom end that extends through both said top opening and bottom opening of said housing tiltably mounted to said pivotable bracket coupling means so that it can tilt in said first X axis and said second Y axis about said pivotable bracket coupling means;

a threaded bolt mounted at the top end of said receiver tube and oriented in a third Z axis;

at least two first actuators having a base end and a movable plunger end, wherein the two first actuators are mounted to the lower surface of said base plate and which, when activated, move said receiver tube and target about said pivotable bracket coupling means in said first X axis and said second Y axis for maintaining said receiver tube in a vertical plumb position;

at least one second actuator having a base end and a movable plunger end and which, when activated, moves said base plate, receiver tube, pivotable bracket coupling means, and target in said third Z axis, substantially orthogonal to both said first X axis and said second Y axis, for maintaining said base plate, receiver tube, pivotable bracket coupling means, and target at a constant height above ground;

a first sensor mounted inside said housing to said receiver tube for determining if said receiver tube is in a vertically plumb position;

communication means between said first sensor and the at least two first actuators for controllably activating said at least two first actuators to tilt said receiver tube in either or both of said first X axis or said second Y axis for maintaining said receiver tube in a vertically plumb position;

a second sensor mounted to the bottom end of said receiver tube outside and below said housing for determining if said receiver tube is at a constant height above ground;

communication means between said second sensor and the at least one second actuator for controllably activating said at least one second actuator to move said base plate, receiver tube, pivotable bracket coupling means, and target in said third Z axis for maintaining said receiver tube at a constant height above ground; and means for visually aligning said device with objects to be surveyed or measured.

2. An automatic plumbing device according to claim 1, wherein said target is selected from the group consisting of a GPS antenna, surveying target, surveying reflector, prism pole, surveying prism, total station prism, or a combination thereof.

3. An automatic plumbing device according to claim 2, wherein said target has a threaded bottom end for receiving said threaded bolt mounted to the top end of said receiver tube.

4. An automatic plumbing device according to claim 1, wherein said housing is waterproof.

5. An automatic plumbing device according to claim 1, further comprising:

means for waterproofing said housing at the opening in the top and the opening at the bottom of said housing.

6. An automatic plumbing device according to claim 5, wherein said means for waterproofing said housing comprises:

a first flexible weatherproof boot having an opening to receive the receiver tube and the bottom of which is mounted to the outside top of said housing over the top opening of the housing and the top of which is mounted to said receiver tube; and a second flexible weatherproof boot having an opening to receive the receiver tube and the bottom of which is mounted to the outside bottom of said housing over the bottom opening of the housing and the top of which is mounted to said receiver tube.

7. An automatic plumbing device according to claim 1, wherein said means for visually aligning the device with objects to be surveyed or measured comprises:

a light source mounted to said receiver tube above the said first flexible weatherproof boot for producing a point of light to align the device with objects to be surveyed; and a mounting bracket for mounting the light source to said receiver tube.

8. An automatic plumbing device according to claim 7, wherein said light source comprises a laser pointer, a light-emitting pointer, a visible cursor, or a combination thereof.

9. An automatic plumbing device according to claim 1, wherein said first sensor comprises a rate gyroscope, an application specific integrated circuit (ASIC), a microcontroller, a computer system, a processor, a microprocessor, a digital signal processor (DSP), or combinations thereof.

10. An automatic plumbing device according to claim 9, wherein said first sensor further comprises;

a mounting plate for mounting said first sensor to said receiver tube; and a mounting bracket for mounting said mounting plate to said receiver tube.

11. An automatic plumbing device according to claim 1, wherein said second sensor comprises a laser sensor, sonar sensor, proximity sensor, or combinations thereof.

12. An automatic plumbing device according to claim 1, wherein said at least two first actuators comprise:

at least two mounting brackets for each said first actuator wherein said brackets mount to the bottom of said base plate and wherein said movable plunger end of each said two first actuators is connected to said receiver tube in a horizontal plane substantially 90 degrees apart.

13. An automatic plumbing device according to claim 1, wherein the base end of said at least one second actuator is mounted inside and to the bottom of said housing and wherein said movable plunger end of said at least one second actuator is connected to the bottom surface of said base plate.

14. An automatic plumbing device according to claim 1, wherein said pivotable bracket coupling means comprises a rotatable bracket coupling, a pivotable bracket coupling, a ball and socket coupling, or combinations thereof.

15. An automatic plumbing device according to claim 1, wherein the communication means between said first sensor and said at least two first actuators further comprises:

an electrical communication means; and at least one first relay in communication with said first sensor and said at least two first actuators.

16. An automatic plumbing device according to claim 1, wherein the communication means between said second sensor and said at least one second actuator further comprises:

an electrical communication means; and at least one second relay in communication with said second sensor and said at least one second actuator.

17. An automatic plumbing device according to claim 1, wherein said base plate tilts about said pivotable bracket coupling means.

18. A method of positioning and maintaining a moving target in a vertical plumb orientation and at a constant height above ground, in spite of a tilted condition of the target, the method comprising:

selecting the device of claim 2;

means for determining tilt of a target in a first X axis and second Y axis;

means for determining height above ground of a target in a third Z axis;

means for positioning a target in a vertical plumb orientation;

means for positioning a target at a constant height above ground; and means for mounting said device to a vehicle.

19. The method according to claim 18, wherein the means for determining tilt further comprises a first sensor.

20. The method according to claim 18, wherein the means for determining height above ground further comprises a second sensor.

21. The method according to claim 18, wherein the means for positioning a target in a vertical plumb position further comprises:
- a first sensor;
- at least two first actuators; and
- at least one first relay.

22. The method according to claim 18, wherein the means for positioning a target at a constant height above ground further comprises:
- a second sensor;
- at least one second actuator; and
- at least one second relay.

23. The method according to claim 18, wherein the mounting means further comprises:
- means for removing said device from the vehicle;
- manual means for relocating said device on the vehicle; and
- electronic means for relocating said device on the vehicle wherein said electronic means is positioned in the vehicle.

24. An automatic plumbing device for positioning and maintaining a moving target in a plumb orientation, in spite of a tilted condition of the device itself, the device comprising:
- a housing having at least one opening in the top and at least one opening in the bottom thereof;
- a base plate having a top surface and a bottom surface and an opening near the center thereof tiltably mounted in said housing so that it can tilt in a first X axis and a second Y axis;
- pivotable bracket coupling means mounted to said base plate in the center and over top of the opening of said base plate and tiltably mounted so that it can tilt in said first X axis and said second Y axis;
- a receiver tube with a top end and a bottom end that extends through both said top opening and bottom opening of said housing tiltably mounted to said pivotable bracket coupling means so that it can tilt in said first X axis and said second Y axis about said pivotable bracket coupling means;
- a threaded bolt mounted at the top end of said receiver tube for accepting a complementary threaded end of a target;
- at least one first relay;
- at least one second relay;
- at least two first actuators having a base end and a movable plunger end, wherein the two first actuators are mounted to the lower surface of said base plate and which, when activated, move said receiver tube and target about said pivotable bracket coupling means in said first X axis and said second Y axis for maintaining said receiver tube in a vertical plumb position;
- at least one second actuator having a base end and a movable plunger end and which, when activated, moves said base plate, receiver tube, pivotable bracket coupling means, and target in a third Z axis substantially orthogonal to both said first X axis and said second Y axis for maintaining said base plate, receiver tube, pivotable bracket coupling means, and target at a constant height above ground;
- a first sensor mounted inside said housing to said receiver tube for determining if said receiver tube is in a vertically plumb position;
- communication means between said first sensor and the at least two first actuators for controllably activating said at least two first actuators to tilt said receiver tube in either or both of said first X axis or said second Y axis for maintaining said receiver tube in a vertically plumb position;
- a second sensor mounted to the bottom end of said receiver tube outside and below said housing for determining if said receiver tube is at a constant height above ground;
- communication means between said second sensor and the at least one second actuator for controllably activating said at least one second actuator to move said base plate, receiver tube, pivotable bracket coupling means, and target in said third Z axis for maintaining said receiver tube at a constant height above ground;
- means for visually aligning said device with objects to be surveyed or measured; and
- means for mounting said device to a vehicle.

25. An automatic plumbing device according to claim 24, wherein said device mounting means further comprises:
- means for relocating said device on the vehicle; and
- means for removing said device from the vehicle.

26. An automatic plumbing device according to claim 25, wherein said relocating means further comprises:
- manual means for relocating said device on the vehicle; and
- electronic means for relocating said device on the vehicle.

27. An automatic plumbing device according to claim 26, wherein said electronic relocating means is positioned in the vehicle.

28. An automatic plumbing device according to claim 24, wherein said target is selected from the group consisting of a GPS antenna, surveying target, surveying reflector, prism pole, surveying prism, total station prism, or a combination thereof.

29. An automatic plumbing device according to claim 28, wherein said target has a threaded bottom end for receiving said threaded bolt mounted to the top end of said receiver tube.

30. An automatic plumbing device according to claim 24, wherein said housing is waterproof.

31. An automatic plumbing device according to claim 24, further comprising:
- means for waterproofing said housing at the opening in the top and the opening at the bottom of said housing.

32. An automatic plumbing device according to claim 31, wherein said means for waterproofing said housing comprises:
- a first flexible weatherproof boot having an opening to receive the receiver tube and the bottom of which is mounted to the outside top of said housing over the top opening of the housing and the top of which is mounted to said receiver tube; and
- a second flexible weatherproof boot having an opening to receive the receiver tube and the bottom of which is mounted to the outside bottom of said housing over the bottom opening of the housing and the top of which is mounted to said receiver tube.

33. An automatic plumbing device according to claim 24, wherein said means for visually aligning the device with objects to be surveyed or measured comprises:
- a light source mounted to said receiver tube above the said first flexible weatherproof boot for producing a point of light to align the device with objects to be surveyed; and
- a mounting bracket for mounting the light source to said receiver tube.

34. An automatic plumbing device according to claim 33, wherein said light source comprises a laser pointer, a light-emitting pointer, a visible cursor, or a combination thereof.

35. An automatic plumbing device according to claim 24, wherein said first sensor comprises a rate gyroscope, an application specific integrated circuit (ASIC), a microcontroller, a computer system, a processor, a microprocessor, a digital signal processor (DSP), or combinations thereof.

36. An automatic plumbing device according to claim 35, wherein said first sensor further comprises;
   a mounting plate for mounting said first sensor to said receiver tube; and
   a mounting bracket for mounting said mounting plate to said receiver tube.

37. An automatic plumbing device according to claim 24, wherein said second sensor comprises a laser sensor, sonar sensor, proximity sensor, or combinations thereof.

38. An automatic plumbing device according to claim 24, wherein said at least two first actuators comprise:
   at least two mounting brackets for each said first actuator wherein said brackets mount to the bottom of said base plate and wherein said movable plunger end of each said two first actuators is connected to said receiver tube in a horizontal plane substantially 90 degrees apart.

39. An automatic plumbing device according to claim 24, wherein the base end of said at least one second actuator is mounted inside and to the bottom of said housing and wherein said movable plunger end of said at least one second actuator is connected to the bottom surface of said base plate.

40. An automatic plumbing device according to claim 24, wherein said pivotable bracket coupling means comprises a rotatable bracket coupling, a pivotable bracket coupling, a ball and socket coupling, or combinations thereof.

41. An automatic plumbing device according to claim 24, wherein the communication means between said first sensor and said at least two first actuators further comprises:
   an electrical communication means; and
   said at least one first relay in communication with said first sensor and said at least two first actuators.

42. An automatic plumbing device according to claim 24, wherein the communication means between said second sensor and said at least one second actuator further comprises:
   an electrical communication means; and
   said at least one second relay in communication with said second sensor and said at least one second actuator.

43. An automatic plumbing device according to claim 24, wherein said base plate tilts about said pivotable bracket coupling means.

* * * * *